United States Patent [19]

Landy

[11] Patent Number: 4,574,521

[45] Date of Patent: Mar. 11, 1986

[54] LOW-POWER INTERMITTENT HANGING PLANTER ROTATOR

[76] Inventor: Stephen D. Landy, 700 Cathedral St., Apt. 3M, Baltimore, Md. 21201

[21] Appl. No.: 701,075

[22] Filed: Feb. 13, 1985

[51] Int. Cl.⁴ .............................................. A01G 9/02
[52] U.S. Cl. ........................................................ 47/67
[58] Field of Search .................. 47/66, 67; 307/141.4, 307/142; 318/484; 340/629

[56] References Cited

U.S. PATENT DOCUMENTS 3,604,536  9/1971  Dinnerstein .............................. 47/67
4,117,630  10/1978  Kalas ....................................... 47/67

Primary Examiner—Robert A. Hafer
Assistant Examiner—Bradley M. Lewis

[57] ABSTRACT

A device, which consumes little power while producing an automatic, periodic, partial rotation of a hanging planter, having a low-power consumption electronic timing circuit, an electric motor, a power supply and electronic and mechanical means to start the motor upon signal from the timing circuit, rotate the planter and stop it after sufficient rotation has occurred. The device is designed so that it can operate for many months using a small power supply such as a flashlight battery and to be as inconspicuous and aesthetically unobstrusive as possible.

12 Claims, 5 Drawing Figures

LOW-POWER INTERMITTENT HANGING PLANTER ROTATOR

BACKGROUND OF THE INVENTION

Heretofore many individuals have recognized the need to rotate hanging plants with respect to their source of light as this promotes better growth and have developed many inventions, both manual and in some respects automatic, to serve these ends. Some individuals have invented rotatable hanging devices such as U.S. Pat. No. 3,957,242 or U.S. Pat. No. 4,189,124 which assist in the manual rotation of the planter. Others have invented apparatuses for automatically rotating a planter through the use of the weight of water added to and evaporated from the planter as a result of feeding, U.S. Pat. No. 4,446,653 while others accomplish this using the weight of the planter itself, U.S. Pat. No. 4,238,002. Still another has utilized a clockwork mechanism, powered by weight, U.S. Pat. No. 4,117,630, for a daily continuous rotation.

Problems arise with these methods, however; because either they need the periodic maintenance of a person over a relatively short time span, one to several days, to physically rotate the planter or reset the weights or they are very irregular or erratic in their function as they depend on the changing weight of the water in the planter which may be affected by humidity, feeding, etc. In the case of the weight powered clockwork device, there also exists the problem of the weights and their chains, which are cumbersome and also affect the aesthetics of the planter.

Another individual has developed a rotatable hanging planter mount, U.S. Pat. No. 4,170,843, which incorporates an electric motor to continuously rotate the planter hanging from it. The problem with a device of this nature is the need for a continuous supply of a relatively large amount of electric power to run the motor. Any small self-contained power supply one might wish to use with such a device, such as a small battery, would quickly wear down. Hooking it up to a conventional 120 line on the other hand, requires additional wiring that may detract from the aesthetics of the unit. Also, in many instances, the places where one wishes to hang a plant are not those in which are found a convenient electric power supply.

Another individual has invented a device for a very efficient continuous rotation of hanging displays, see U.S. Pat. No. 3,604,536. But this device is not well suited for rotating planters both because of their relatively heavy mass and because it produces a rotation of a continuous and constantly varying nature. One seeks primarily to rotate plants in a manner so as to promote only a better, more even growth and does not need or wish to have the plants constantly swirling around, as this may detract from both their beauty and the ambience of the place in which they are hung.

SUMMARY OF THE PRESENT INVENTION

My present invention is designed to overcome all the aforementioned problems in a most simple, economical and efficient manner. It serves effectively to rotate a hanging planter so as to promote the better growth of the plant for an extended period of time with very little maintenance and a minimum of electric power so that it may function for a long period of time using a common flashlight battery. It is also small, aesthetically unobstrusive and adapted for use with most existing hanging planters and their support mounting.

This is accomplished in primarily two ways. The first is through the use of a very low power consumption electronic timing circuit such as is used presently in many clocks, watches and computers. The second is by having the timing circuit control a small electric motor to rotate the planter only on an intermittent basis, such as once a day or every few days, and only to rotate the planter some portion of a circle, such as 120 degrees. This invention is further designed to operate off of a common power supply such as a household flashlight battery, which is contained in the unit and can be replaced when necessary. It is readily seen that the design and principles behind this invention necessitate such low power consumption that a small power source such as that mentioned above will operate it for many months with no maintenance. This invention can also be easily adapted for other uses in which such rotation could be useful or beneficial.

Further objects or advantages of my invention will become apparent from a consideration of the accompanying specifications, drawings and claims.

BRIEF DESCRIPTION OF THE DRAWING

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which.

DESCRIPTION OF THE PREFERRED EMBODIMENT

Figure 1:
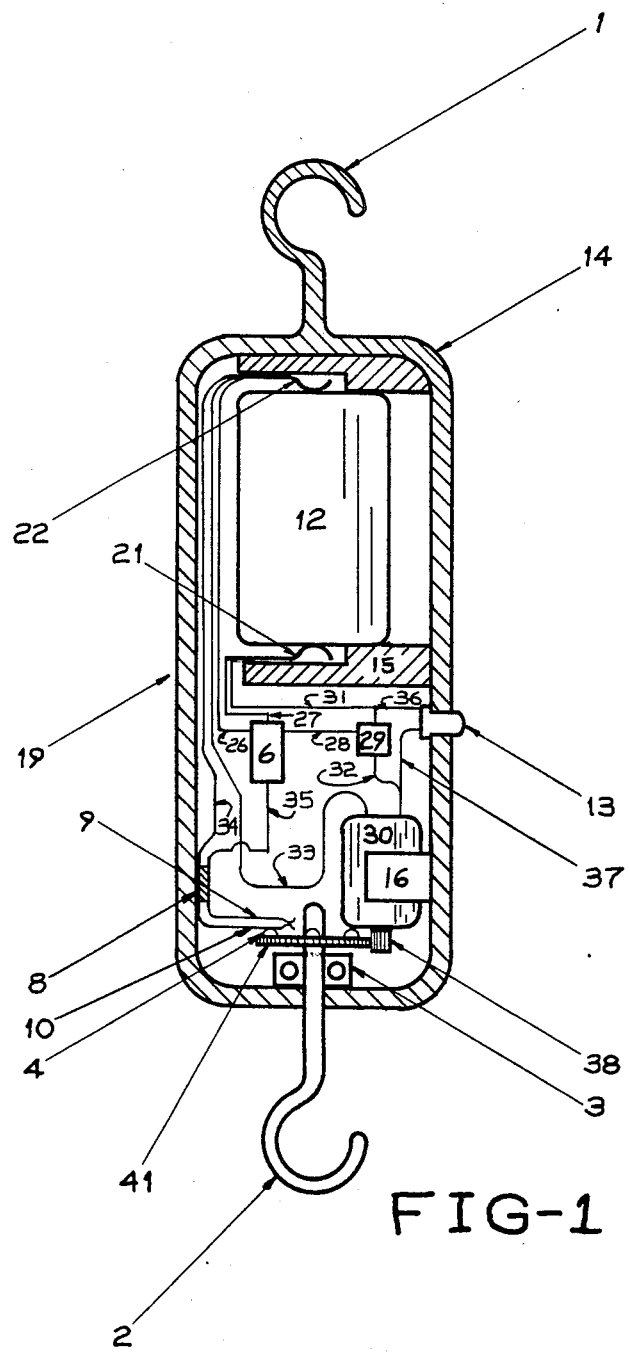
FIG. 1 represents a transverse sectional view of the present invention in which the detection means is a mechanical contact switch.

FIG. 1 illustrates a hanging plant rotator 19 of the present invention. The hanging plant rotator 19 includes a housing 14 which is formed of molded plastic and is provided with a partition wall 15 to hold the power supply 12, which is a conventional flashlight battery, against the electrical contacts 21 and 22. The attachment means 1 is formed in the shape of a hook on its outer end and is actually an extension of the same molded plastic which forms housing 14. The securing means 2 is made of metal and is also formed on its outer end in the shape of a hook and is securely but rotatably fastened to housing 14 by means of bearing 3. Wire 26 connects contact 22 to timing device 6, which is a low-power consumption integrated circuit. Wire 27 connects timing device 6 to contact 21. Wire 28 connects timing device 6 to switch means 29, which is a silicon-controlled rectifier or other transistor which will control, upon current from timing device 6, sufficient current to run electric motor 30. Switch means 29 is connected to contact 21 by wire 31. The other side of switch means 29 is connected by wire 32 to electric motor 30. The other side of electric motor 30 is connected to contact 22 by wire 33. Motor 30 is securely attached to housing 14 by molded plastic studs 16. Shaft 38 on end on motor 30 is geared to gear 41. Gear 41 is securely attached to attachment means 2. Gear 41 has on its upper surface a plurality of raised bumps 4. Detection means 8 is a mechanical contact switch secured to side of housing 14 and extending over gear 41 and is constructed of two flexible metal plates 9 and 10. Plate 10 is connected to contact 22 by wire 34. Plate 9 is connected to timing device 6 by wire 35. Testing means 13 is a conventional pushbutton contact switch and is attached in side of housing 14 so that pushbutton is exposed to outer surface of housing 14. One side of testing means 13 is connected by wire 36 to wire 31. Other side of testing means 13 is connected by wire 37 to wire 32.

The invention funtions as follows: The power supply 12 supplies electric power to the various components through contacts 21 and 22 and the various wires connected to them. Power is supplied to timing device 6 by wires 26 and 27. After a period of time, depending on design of timing device, has elapsed timing device 6 will conduct a current to switch means 29 through wire 28. This current will cause switch means 29 to allow sufficient current to flow through wire 31, which is connected to contact 21, to wire 32 to power motor 30, whose electric circuit is completed by wire 33 that connects it to contact 22. As motor 30 runs shaft 38 turns and engages gear 41, which is securely attached to attachment means 2. As a result, attachment means 2 is rotated. After a certain amount of rotation, depending upon spacing of raised bumps 4, a raised bump 4 will cause flexible metal plate 9 and flexible metal plate 10 ,which make up detection means 8, to come into contact with each other. This will send an electrical signal to timing device 6 through wire 35 which connects timing device 6 to flexible metal plate 9. The other flexible metal plate 10 is connected to contact 22 by wire 34. The electrical signal sent to timing device 6 through wire 35 will reset timing device 6 and end current from timing device 6 through wire 28 to switch means 29 and cause switch means 29 to open connection between wires 31 and 32 thus turning off motor 30.

Timing device 6 is designed to recycle from this signal and an automatic, periodic, partial rotation of attachment means 2 with respect to housing 14 will repeatedly occur. As a planter is hung from attachment means 2 and securing means 1 is attached to a stationary support, the planter will thus be rotated.

Testing means 13 is a conventional pushbutton switch that functions to override switch means 29 to test operation of motor 30 and/or status of power supply 12. It is connected to wire 31 by wire 36 and to wire 32 by wire 37. On pushing of button on testing means 13 current is conducted through it as to bypass switch means 29 and engage motor 30.

Figure 2:
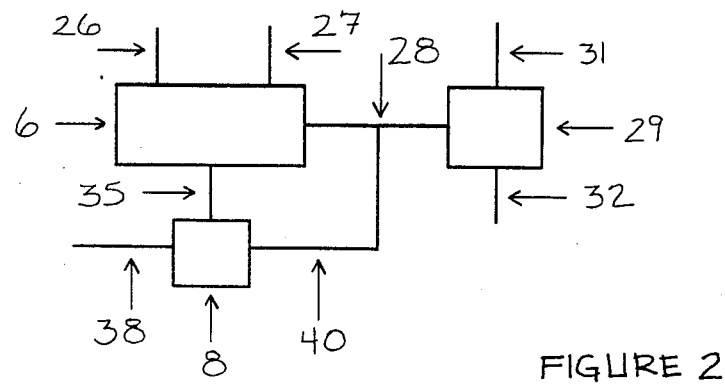
FIG. 2 represents a partial schematic of electrical circuits in the present invention in which the detection means is a time delay switch.

FIG. 2 is represents a schematic of the electrical circuits of the invention (less motor 30, contact 21, contact 22, power supply 12, testing means 13, wire 36, wire 37, wire 33) in which the mechanical contact switch 8 of FIG. 1 has been replaced by a time delay switch 8. Time delay switch 8 is connected to contact 21 by wire 39. The other side of time delay switch 8 is connected to wire 28 by wire 40. As in FIG. 1, wire 35 connects time delay switch 8 to timing device 6. In this embodiment, the wire 34 of FIG. 1 does not exist.

In this embodiment, when timing device 6 conducts current through wire 28 it also delivers electric power to time delay switch 8 through wire 40. This current causes time delay switch 8 to operate. After a period of time, depending upon design of time delay switch 8, an electrical signal is conducted through wire 35 which functions as the aforementioned signal from mechanical contact switch 8 in FIG. 1. Also, the bumps 4 on gear 41 are no longer necessary.

Depending on the cost and sophistication of integrated circuits being commercially produced, it may be advantageous to use an integrated circuit in which the timing device 6 and/or the switch means 29 and/or detection means 8 (in the case of a time delay switch) are consolidated into one integrated circuit. Wiring diagrams as displayed in FIGS. 3 and 4 illustrate these designs.

Figure 3:
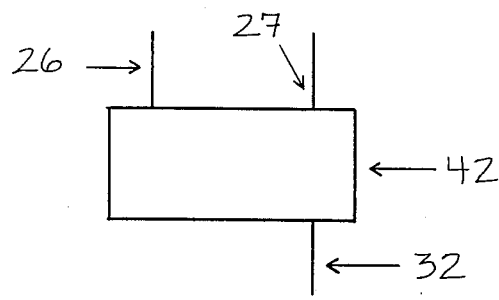
FIG. 3 represents a partial schematic of electrical circuits in the present invention in which the detection means (in this case a time delay switch), switch means and timing device are integrated into one integrated circuit.

FIG. 3 illustrates the ultimate design wherein the switch means 29 is integrated with the timing device 6 and the time delay switch 8 of FIG. 2 in one integrated circuit. In this case wire 28, wire 31, wire 35, wire 39, and wire 40 are not necessary as all these electrical connections are made within integrated circuit 42. All that remains are wire 26 and wire 27 which supply power, wire 32 which connects to motor 30, and wire 33 (not shown). Also, the bumps 4 on gear 41 are no longer necessary.

Figure 4:
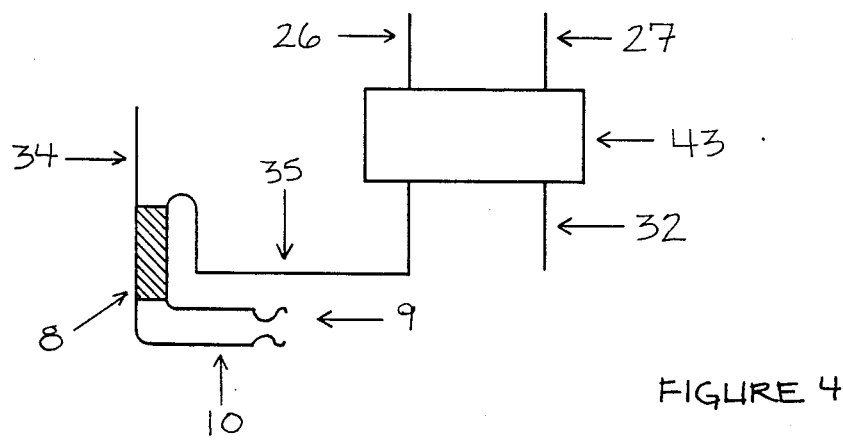
FIG. 4 represents a partial schematic of electrical circuits in the present invention in which the timing device and switch means are integrated into one integrated circuit and the detection means is a mechanical contact switch.

FIG. 4 follows the design of FIG. 1, though since in this case the detection means 8 is a mechanical contact switch 8, only the timing device 6 and the switch means 29 may be integrated into one integrated circuit 43. In this case the wire 28 and wire 31 no longer are necessary.

Figure 5:
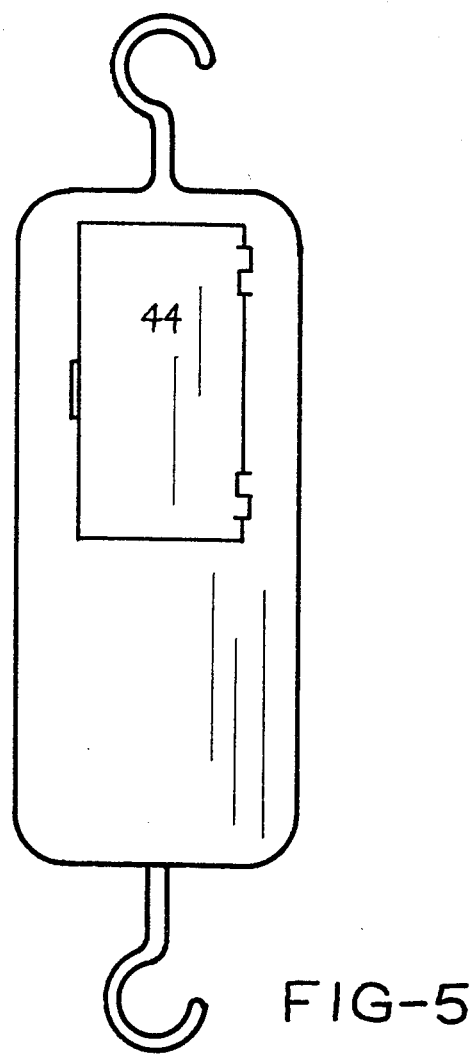
FIG. 5 represents an exterior view of the present invention.

FIG. 5 illustrates the body of housing 14 with detail of a conventional door 44 for easy replacement of the battery 12.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

I claim:
1. Hanging planter rotator apparatus comprising:
   a. an electric motor;
   b. an electric power supply;
   c. an electric circuit connecting said motor to said power supply;
   d. switch means connected to said electric circuit in series with said power supply and said motor for starting and stopping said motor;
   e. an electric timing device;
   f. an electric circuit connecting said timing device to said power supply;
   g. an electric circuit connecting said timing device to said switch means to control closing of said switch means upon signal from said timing device;
   h. a housing for housing of said apparatus;
   i. securing means for attaching said housing to a stationary support;

j. attachment means for attaching a hanging planter to said apparatus;

k. output means associated with said motor and said attachment means for rotating said attachment means upon operation of said motor;

l. detection means for detecting when proper amount of rotation of said attachment means has occurred;

m. an electric circuit connecting said detection means to said power supply;

n. electric circuit means connecting said detection means to said timing device and said switch means for resetting said timing device and opening of said switch means upon signal of said detection means whereby said apparatus will automatically periodically partially rotate attachment means with respect to said housing.

2. The apparatus of claim 1 wherein said output means is mechanical gearing connecting said motor to said attachment means.

3. The apparatus of claim 1 wherein said attachment means is formed on its outer end as a hook.

4. The apparatus of claim 1 wherein said securing means is formed on its outer end as a hook.

5. The apparatus of claim 1 wherein said timing device is a low power consumption integrated circuit.

6. The apparatus of claim 1 wherein said detection means is a time delay switch activated by said timing device upon closing of said switch means.

7. The apparatus of claim 2 wherein said detection means is a mechanical contact switch activated by some rotation of said gearing.

8. The apparatus of claim 1 wherein said attachment means is attached to said housing by means of a bearing which allows low-friction rotation of said attachment means and secures said attachment means to said housing.

9. The apparatus of claim 6 wherein said detection means is integrated with said timing device in one integrated circuit.

10. The apparatus of claim 1 wherein said switch means is integrated with said timing device in one integrated circuit.

11. The apparatus of claim 6 wherein said timing device and said switch means and said detection means are integrated in one integrated circuit.

12. The apparatus of claim 1 further comprising a testing means to test operation of said motor and/or said power supply.

* * * * *